(12) United States Patent
Müller et al.

(10) Patent No.: US 11,313,667 B2
(45) Date of Patent: Apr. 26, 2022

(54) METHODS FOR THE STABILIZATION OF INTERFEROMETRIC SYSTEMS AND INTERFEROMETRIC SYSTEMS IMPLEMENTING SUCH METHODS

(71) Applicant: LightOn SAS, Paris (FR)

(72) Inventors: Kilian Müller, Paris (FR); Laurent Daudet, Paris (FR); Igor Carron, Paris (FR); Gustave Pariente, Paris (FR)

(73) Assignee: LightOn SAS, Paris (FR)

( * ) Notice: Subject to any disclaimer, the term of this patent is extended or adjusted under 35 U.S.C. 154(b) by 0 days.

(21) Appl. No.: 16/987,957

(22) Filed: Aug. 7, 2020

(65) Prior Publication Data
US 2021/0041219 A1    Feb. 11, 2021

(30) Foreign Application Priority Data
Aug. 9, 2019 (EP) .................................... 19315092

(51) Int. Cl.
| | | |
|---|---|---|
| *G01B 9/02* | (2006.01) | |
| *G01B 9/02015* | (2022.01) | |
| *G01B 9/02001* | (2022.01) | |
| *G01B 9/02056* | (2022.01) | |
| *G01B 9/02055* | (2022.01) | |

(52) U.S. Cl.
CPC ..... *G01B 9/02028* (2013.01); *G01B 9/02007* (2013.01); *G01B 9/02057* (2013.01); *G01B 9/02072* (2013.04)

(58) Field of Classification Search
CPC ............ G01B 9/02007; G01B 9/02028; G01B 9/02057; G01B 9/02067; G01N 21/4795
See application file for complete search history.

(56) References Cited

U.S. PATENT DOCUMENTS

| 5,621,752 A | 4/1997 | Antonio et al. |
|---|---|---|
| 10,313,018 B2 | 6/2019 | Gigan et al. |

(Continued)

OTHER PUBLICATIONS

S. Popoff et al. "Image transmission through an opaque material" Nature Communications, vol. 1, No. 1; Sep. 21, 2010 (5 pages).

(Continued)

*Primary Examiner* — Michael A Lyons
(74) *Attorney, Agent, or Firm* — Osha Bergman Watanabe & Burton LLP (57) ABSTRACT

The present description relates to a stabilized interferometric system comprising: a light source (210) for emitting an initial beam of coherent light; a spatial light modulator (220) configured to receive at least a first part of said initial beam and input data (203) and configured to emit a spatially modulated beam resulting from a spatial modulation of a parameter of said first part of said initial beam based on said input data; a scattering medium (230) configured to receive said spatially modulated beam; a detection unit (240) configured to acquire an interference pattern ($IN_0$) resulting from the interferences between randomly scattered optical paths taken by the spatially modulated beam through the scattering material; a control unit (250) configured to vary the frequency of the laser source in order to at least partially compensate a change in said interference pattern resulting from a change in at least one environmental parameter.

11 Claims, 4 Drawing Sheets

(56) References Cited

U.S. PATENT DOCUMENTS

| | | | | |
|---|---|---|---|---|
| 2003/0147432 | A1* | 8/2003 | Bukkems | H01S 5/06256 372/20 |
| 2010/0123944 | A1* | 5/2010 | Ito | G11B 7/083 359/11 |
| 2010/0172651 | A1 | 7/2010 | Nien et al. | |
| 2012/0182558 | A1* | 7/2012 | Masumura | A61B 5/0068 356/450 |
| 2012/0182591 | A1* | 7/2012 | Masumura | G01N 21/00 359/11 |
| 2018/0019822 | A1 | 1/2018 | Gigan et al. | |
| 2018/0266890 | A1* | 9/2018 | Dholakia | G01J 3/0205 |
| 2018/0367192 | A1 | 12/2018 | O'Shea et al. | |

OTHER PUBLICATIONS

V. Durán et al., "Computational imaging with single-pixel detection: applications in scattering media"; Proceedings of the 13th Workshop on Information Optics (WIO'14); XP032665465; Jul. 7, 2014 (3 pages).

A. Liutkus et al., "Imaging with Nature: A Universal Analog Compressive Imager Using a Multiply Scattering Medium"; ARXIV:1309.0425V1; XP055194020; Sep. 2, 2013 (15 pages).

D. B. Conkey et al., "High-speed, phase-control of wavefronts with binary amplitude DMD for light control through dynamic turbid media"; Proceedings of the SPIE; vol. 8617, 86170; XP055267116; Mar. 5, 2013 (6 pages).

D. Akbulut et al., "Focusing light through random photonic media by binary amplitude modulation"; Optics Express, vol. 19, No. 5, pp. 4017-4029; XP055267135; Feb. 15, 2011 (13 pages).

International Search Report issued in corresponding application No. PCT/EP2016/052438 dated Apr. 29, 2016 (3 pages).

Written Opinion of the International Searching Authority issued in corresponding application No. PCT/EP2016/052438 dated Apr. 29, 2016 (7 pages).

\* cited by examiner

METHODS FOR THE STABILIZATION OF INTERFEROMETRIC SYSTEMS AND INTERFEROMETRIC SYSTEMS IMPLEMENTING SUCH METHODS

PRIOR ART

Technical Field

The present description relates to methods for the stabilization of interferometric systems and interferometric systems implementing such methods. It applies in particular to the stabilization of interferometric systems using a scattering medium, e.g. a multiple scattering medium (MSM).

Prior Art

Recently, interferometric systems using a scattering medium for generating interferences of randomly scattered light beams, in particular a multiple scattering medium (MSM), have been used in optical computing systems, also referred to optical processing units (OPU) in the present description. Such OPUs are described for example in US2018/0019822.

Figure 1:
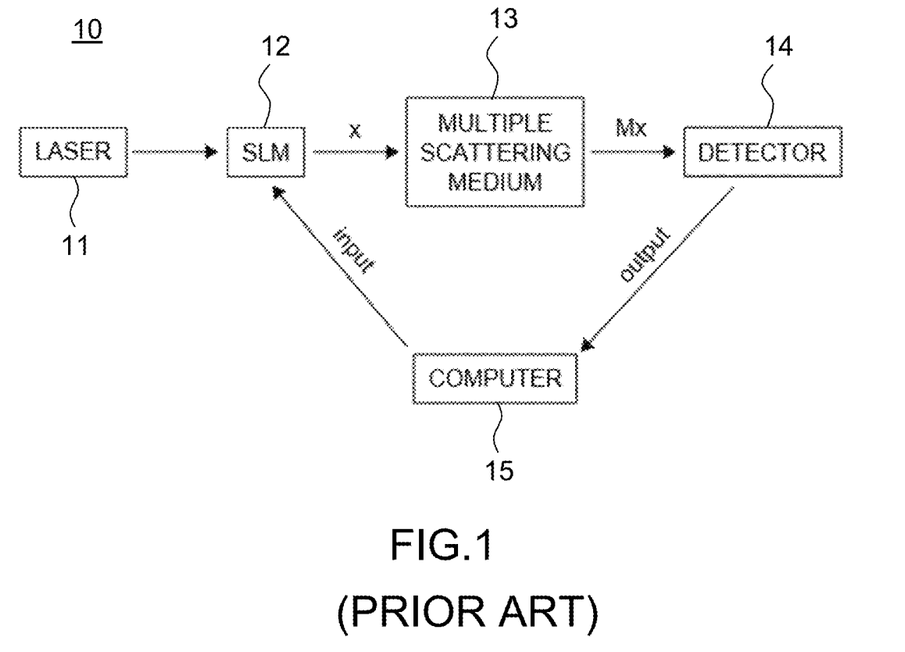
FIG. 1 (already described), a block diagram of an optical processing unit according to the prior art.

FIG. 1 shows a block diagram of an example of an OPU as described in the above cited prior art.

In the OPU 10 described in FIG. 1, a light beam is emitted from a laser 11, and directed towards a spatial light modulator 12 (SLM). Information, which is represented as a vector x, is programmed onto the SLM and consequently imprinted onto the beam as modulations of the light field. Such information results for example from digital input data of a processing unit 15, e.g. a computer. Such digital input data may comprise any kind of data, e.g. images, videos, text, sound, etc. The modulated light beam is then transported through a scattering medium 13, e.g. a multiple scattering medium (MSM). The light field at the output of the MSM thus results from the interference of many different randomly scattered optical paths the light takes through the medium. The light field is then detected by a detector 14, e.g. a camera and the detector output is sent back to the processing unit 15. The processing of the output depends on the algorithm that the OPU is part of, for example a machine learning algorithm.

The propagation of the light from the SLM to the detector 14 may be modeled by a transmission matrix M, as described for example in Popoff, Sébastien, et al. ("*Image transmission through an opaque material*" Nature communications 1 (2010): 81). In the OPU described in FIG. 1, the transmission matrix includes the transport of the light through the MSM 13. The light field arriving at the detector is thus represented by a vector y=M x resulting from the multiplication of the input vector x by the transmission matrix M.

In OPUs as described for example in US2018/0019822, interference patterns produced at the output of the MSM respond very sensitively to changes of the relative path lengths. Such systems thus require a high level of stability in the environment such that the transmission matrix is not disturbed. Environmental parameters that may induce those changes include, but are not limited to, temperature induced expansion or contraction of the materials used, or changes of refractive indices due for example to changes in air pressure or humidity.

There are two established ways to make such interferometric systems more stable, which may be used individually or in combination: use materials that are stable with respect to changes of environmental parameters, and build the optical system inside a volume in which fluctuating environmental parameters are either passively or actively stabilized.

Historically, a milestone concerning the first point was the discovery and development of low and ultra-low thermal expansion materials. Prominent examples are ULE glass by Corning®, the Zerodur glass-ceramic by Schott®, and the metal alloy Invar®. Although these materials provide very good stability with respect to thermal fluctuations, they are generally more expensive and harder to machine than materials with higher thermal expansion coefficients like steel or aluminum.

Concerning the second point, some optical systems are simply shielded from outside influences by placing them in a protective volume. Examples include placing optical systems under a controlled atmosphere or even under vacuum in order to prevent the changing atmospheric pressure and relative humidity from influencing the performance, and actively controlling the temperature of the volume. This approach may entail a significant increase in the complexity of the system, and render it bulkier and more expensive.

The method of stabilization as described in the present description further improves the stability of optical interferometric systems and can be used to at least partially replace the need for the methods outlined above.

SUMMARY

According to a first aspect, the present description relates to a stabilized interferometric system comprising:
- a light source for emitting an initial beam of coherent light;
- a spatial light modulator configured to receive at least a first part of said initial beam and input data, and configured to emit a spatially modulated beam resulting from a spatial modulation of a parameter of said first part of said initial beam based on said input data;
- a scattering medium configured to receive said spatially modulated beam;
- a detection unit configured to acquire an interference pattern in a first detection plane at an output of said scattering medium, wherein said interference pattern results from the interferences between randomly scattered optical paths taken by the spatially modulated beam through the scattering medium;
- a control unit configured to vary the frequency of the light source in order to at least partially compensate a change in said interference pattern resulting from a change in at least one environmental parameter.

The applicant has observed that a change in an environmental parameter, e.g. temperature induced expansion or contraction of the scattering medium, or a change of refractive indices due for example to changes in air pressure or humidity, induces a change of the optical path lengths by a global factor. This change of the optical path lengths results in a change of the interference pattern. The stabilized interferometric system as described above enables to recover the original interference pattern through a change of the frequency (or wavelength) of the light source to at least partially compensate the change of the optical path lengths.

The applicant has shown that the method for recovering the original interference pattern implemented by the system as described above is applicable when the frequency change $\Delta f$ requested to compensate the change of the dimensions of the system is sufficiently small compared to the absolute frequency f, typically lower or much lower than 1% of the absolute frequency f. In one or other embodiments, the system further uses materials that are stable with respect to changes of environmental parameters and/or is further built inside a volume in which fluctuating environmental parameters are low to keep the frequency change small enough.

In one or other embodiments, the light source for emitting an initial beam of coherent light is a laser source. Laser sources are preferred as they provide spatially and temporally coherent light beams of high optical power and low intensity fluctuations. In the following description, we will thus generally refer to "laser source" and "beam"; however, it should be understood that other spatially and/or temporally coherent light sources may be appropriate.

The frequency of the light source is inversely proportional to the wavelength of the light source and in the present description, we may use one or the other parameter.

In one or other embodiments, the laser source comprises one of the followings sources: a diode-pumped solid-state laser (DPSS laser), a single frequency diode laser, an external cavity laser diode.

In one or other embodiments, the frequency of the laser source is varied by temperature control of one of the components of the laser source, e.g. a DPSS laser or a diode laser, and/or via changing the current, e.g. for a diode laser, and/or via changing the length of the external cavity, and/or through a wavelength selective grating placed inside the cavity, e.g. in an external cavity laser diode.

In one or other embodiments, the laser source is configured to emit a radiation having a wavelength in the visible range (400-750 nm) or in the near infrared range or in the infrared range, up to around 2 μm.

In one or other embodiments, a parameter of said first part of said initial beam spatially modulated is the amplitude, the intensity, the phase and/or the polarization of the initial beam.

In one or other embodiments, the SLM 220 comprises a plurality of independently addressable micro-mirrors and is configured to spatially modulate the amplitude of the initial beam. Alternatively, the SLM 220 may comprise a plurality of independently addressable liquid crystal elements and is configured to spatially modulate the phase and/or the polarization of the initial beam.

The scattering medium can in particular be, or comprise, a multiple scattering medium (MSM).

By "scattering", it is meant a process and a medium in which electromagnetic radiation that composes an electromagnetic beam is forced to elastically deviate from straight trajectories by non-uniformities of the refractive index in a medium. By "multiple scattering" it is thus meant a process and a medium in which the radiation that enters the medium is scattered several times before exiting the medium.

Examples of scattering media suitable for the invention comprise translucent materials, amorphous materials such as paint pigments, amorphous layers deposited on glass, scattering impurities embedded in transparent matrices, nano-patterned materials and polymers.

More specifically, examples of multiple scattering media suitable for the invention comprise white polymer plates, for instance PTFE, white acrylic resin, and other white materials such as layers of TiO2 particles (white paint).

In one or other embodiments, the detection unit is further configured to acquire a reference interference pattern in said first detection plane; the reference interference pattern may result from the interferences between randomly scattered optical paths taken by a reference beam through the scattering medium. The control unit is then configured to vary the frequency of the laser source as a function of a change in said reference interference pattern.

In one or other embodiments, the reference beam results from a spatial modulation of a parameter of said first part of said initial beam based on reference input data.

In one or other embodiments, the detection unit is configured to acquire a reference interference pattern resulting from the interferences between randomly scattered optical paths taken by a reference beam through the scattering medium, wherein said reference beam is generated by a second part of said initial beam directly sent to said scattering material. The control unit is then configured to vary the frequency of the laser source as a function of a change in said reference interference pattern.

In one or other embodiments, said reference interference pattern is acquired in said first detection plane.

In one or other embodiments, said reference interference pattern is acquired in a second detection plane different from said first detection plane.

In one or other embodiments, said stabilized interferometric system further comprises a reference optical detector; wherein
  the reference optical detector is configured to acquire a reference interference pattern resulting from the interferences between randomly scattered optical paths taken by a reference beam through the scattering material, wherein said reference beam is generated by a second part of said initial beam directly sent to said scattering medium;
  the control unit is configured to vary the frequency of the laser source as a function of a change in said reference interference pattern.

In one or other embodiments, the detection unit comprises at least a first one-dimensional or bi-dimensional optical detector having said first detection plane; said first one-dimensional or bi-dimensional optical detector may comprise for example a camera sensor, for example a CCD ("charge-coupled display") sensor or a CMOS («complementary metal-oxide-semiconductor») sensor, or an array of photodiodes.

In one or other embodiments, the stabilized interferometric system further comprises an environmental sensor to monitor at least one environmental parameter; the control unit is then configured to vary the frequency of the laser source as a function of a change in a measure of said at least one environmental parameter.

According to a second aspect, the present description relates to methods implemented by systems according to the first aspect.

According to one or more embodiments, the present description relates to a method for stabilization of an interferometric system, wherein said interferometric system comprises:
  a light source for emitting an initial beam of coherent light;
  a spatial light modulator configured to receive at least a first part of said initial beam and input data, and configured to emit a spatially modulated beam resulting from a spatial modulation of a parameter of said first part of said initial beam based on said input data;
  a scattering medium configured to receive said spatially modulated beam;
  a detection unit configured to acquire an interference pattern in a first detection plane at an output of said scattering medium, wherein said interference pattern results from the interferences between randomly scattered optical paths taken by the spatially modulated beam through the scattering medium;
wherein the method comprises:
varying the frequency of the laser source in order to at least partially compensate a change in said interference pattern resulting from a change in at least one environmental parameter.

In one or other embodiments, a parameter of said first part of said initial beam spatially modulated is the amplitude, the intensity, the phase and/or the polarization of the initial beam.

In one or other embodiments, the scattering medium is a multiple scattering medium.

In one or other embodiments, the method further comprises:
acquiring, using the detection unit, a reference interference pattern in said first detection plane, wherein the reference interference pattern results from the interferences between randomly scattered optical paths taken by a reference beam through the scattering medium;
varying the frequency of the laser source as a function of a change in said reference interference pattern.

In one or other embodiments, the reference beam results from a spatial modulation of a parameter of said first part of said initial beam based on reference input data.

In one or other embodiments, the method further comprises:
acquiring, using the detection unit, a reference interference pattern resulting from the interferences between randomly scattered optical paths taken by a reference beam through the scattering medium, and wherein said reference beam is generated by a second part of said initial beam directly sent to said scattering medium;
varying the frequency of the laser source as a function of a change in said reference interference pattern.

In one or other embodiments, said reference interference pattern is acquired in said first detection plane.

In one or other embodiments, said reference interference pattern is acquired in a second detection plane different from said first detection plane.

In one or other embodiments, varying the frequency of the laser source comprises:
calculating a measurement of similarity between two interference patterns corresponding to said reference interference pattern acquired at two different times;
determining a variation of the laser frequency to apply to the light source based on said measurement of similarity.

For example, calculating a measurement of similarity may comprise at least one of the following methods: calculating a cross correlation, calculating a normalized cross correlation (cosine similarity), calculating the Euclidian distance (norm of the difference), or calculating the structural similarity (SSIM) between said two interference patterns. However, other methods are known by the skilled man.

In one or other embodiments, the method further comprises:
monitoring, using an environmental sensor, at least one environmental parameter
varying the frequency of the laser source as a function of a change in a measure of said at least one environmental parameter.

In one or other embodiments, the variation of the frequency of the laser source is made using a prior calibration.

BRIEF DESCRIPTION OF THE DRAWINGS

Other advantages and features of the invention will become apparent on reading the description, which is illustrated by the following figures.

DETAILED DESCRIPTION

In the figures, identical elements are indicated by the same references.

Figure 2:
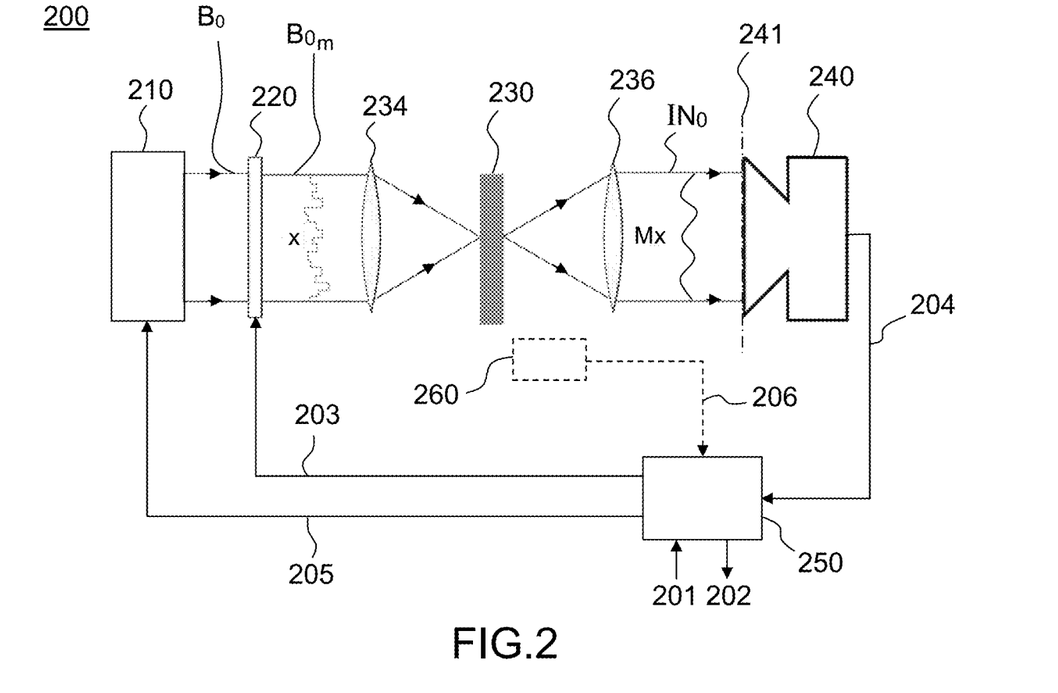
FIG. 2, schematic of an optical processing unit (OPU) including a stabilized interferometric system according to an embodiment of the present description.

FIG. 2 is a schematic of a stabilized interferometric system 200 according to an embodiment of the present description, e.g. an optical processing unit (OPU) fed with digital input data 201 and providing digital output data 202.

For instance, the OPU may implement methods of statistical Machine Learning as known in the art (in particular for classification or regression, such as deep neural networks or Randomized Kernel Machines for instance). The OPU may also implement methods for deterministic or randomized numerical linear algebra (for instance in the field of Large Scale scientific computations involving matrix and tensor randomization). In a general way, optical processing units may find use in any digital data processing involving but not limited to one of a Stochastic Gradient Descent solver, a convolutional or random layer in a Deep Neural Network, an Echo State Machine, a Reservoir Computing, a Large Scale Random kernel, an Extreme Learning Machine, a Randomized Numerical Linear Algebra algorithm, a Locally Sensitive Hashing, an iterative eigen solver and/or a Database friendly random projection.

As illustrated in FIG. 2, the stabilized interferometric system 200 comprises a laser source 210 for emitting an initial beam $B_0$ of coherent light. It further comprises a spatial light modulator 220 (SLM) configured to receive said initial beam and input data 203 and emit a spatially modulated beam $B_{OM}$, wherein said spatially modulated beam results from a spatial modulation of a parameter of said initial beam based on said input data. The parameter of said initial beam spatially modulated is for example the amplitude, the intensity, the phase and/or the polarization of the initial beam.

The SLM 220 can be, for instance an electrically addressed beam modulator. For example, the SLM 220 comprises a plurality of independently addressable micromirrors and is configured to spatially modulate the amplitude of the initial beam. Alternatively, the SLM 220 may comprise a plurality of independently addressable liquid crystal elements and is configured to spatially modulate the phase and/or the polarization of the initial beam.

The stabilized interferometric system 200 further comprises a scattering medium 230, preferably a multiple scattering medium (MSM), configured to receive said modulated beam $B_{OM}$ and a detection unit 240 configured to acquire an interference pattern $IN_0$ in a first detection plane 241 at an output of said MSM, wherein said interference pattern results from the interferences between randomly scattered optical paths taken by the spatially modulated beam $B_{OM}$ through the multiple scattering medium 230. In the example of FIG. 2, lenses 234 and 236 serve respectively to guide the spatially modulated beam $B_{OM}$ into the MSM and to collect the light exiting the MSM, in order to prevent too high optical losses and/or an excessive size of the optical setup.

The stabilized interferometric system 200 further comprises a control unit 250 receiving an electronic signal 204 issued by the detection unit 240 and corresponding to the acquisition of the interference pattern. The control unit 250 is configured to vary the frequency of the laser source in order to at least partially compensate a change in said interference pattern resulting from a change in at least one environmental parameter. The variation of the frequency of the laser source will be described in further details below.

The control unit 250 is referred in the description as a single component but may comprise a plurality of distinct electronic components. The control unit 250 can for instance be, or comprise, a processing unit such as a central processing unit (CPU), a graphic processing unit (GPU), a Field Programmable Gate Array (FPGA), an Application-Specific Integrated Circuit (ASIC) and/or any type of such processing unit known in the art. The control unit and other elements of the stabilized interferometric system 200 are connected together, directly or through interconnection electronic components (not shown in FIG. 2). The control unit may provide the input data 203 to the SLM 220 and receive output signals 204 from the detection unit to issue output data 202.

The input data 203 may be data resulting for the pre-processing of digital input data 201 fed to the OPU. Such digital input data 201 may be any kind of data: images, videos, text, sound, time series or more abstract data, e.g. data which are the output of an algorithm such as a neural network.

The pre-processing of the input data 201 may be made using a digital input circuit (not shown in FIG. 2). The pre-processing stage takes care that the input data 203 is accepted by, and can be displayed on the SLM. For example, if the SLM is a Digital Mirror Device (DMD), it can only display binary values. An image, for example, therefore first has to be converted into black and white pixels. A different SLM, e.g. a liquid crystal based SLM may display 256 (8 bit) gray scale type values. An image that has more gray levels than that (for example 1024, 10 bit) would have to be converted accordingly.

The nature of the digital output data 202 very much depends on the (machine learning) algorithm that the OPU is part of. Some examples are, if the OPU is the last dense layer of a neural network, data to be fed into a classifier. In other applications for recurrent neural networks, the output data 202 may then be fed back into the OPU. Depending on the application, the number of bits of said digital output data 202 may be smaller or equal or larger than the number of bits of said digital input data 201, as explained for example in the above cited prior art US2018/0019822.

The laser source 210 may comprise a DPSS (diode pumped solid state) laser, where the wavelength can be controlled via changing the temperature of one or more components of the laser.

The laser source 210 may also comprise a single frequency diode laser, where the wavelength can be controlled via temperature control of the diode junction. This can be accomplished either through a TEC (for "thermoelectric cooler"), or via changing the current of the laser diode.

The laser source 210 may also comprise an external cavity laser diode, where the wavelength may be controlled via changing the length of the external cavity, and/or through a wavelength selective grating placed inside the cavity.

Examples of scattering media 230 generally suitable for the invention may comprise translucent materials, amorphous materials such as paint pigments, amorphous layers deposited on glass, scattering impurities embedded in transparent matrices, nano-patterned materials and polymers. An example of a multiple scattering medium is a layer of an amorphous material such as a layer of Zinc-oxide (ZnO) on a substrate. Multiple scattering media perform a very complex yet deterministic scattering of the electromagnetic beam.

The detection unit 240 may comprise one or a plurality of one-dimensional or bi-dimensional optical detectors, as it will be described below.

Such optical detector comprises for example a camera sensor, e.g. a CCD sensor or a CMOS sensor, or an array of photo diodes.

As shown in FIG. 2, the stabilized interferometric system 200 may further comprise an environmental sensor 260 configured to monitor at least one environmental parameter 206. The control unit is then configured to vary the frequency of the laser source as a function of a change in a measure of said at least one environmental parameter, as it will be explained below.

Figure 3A:
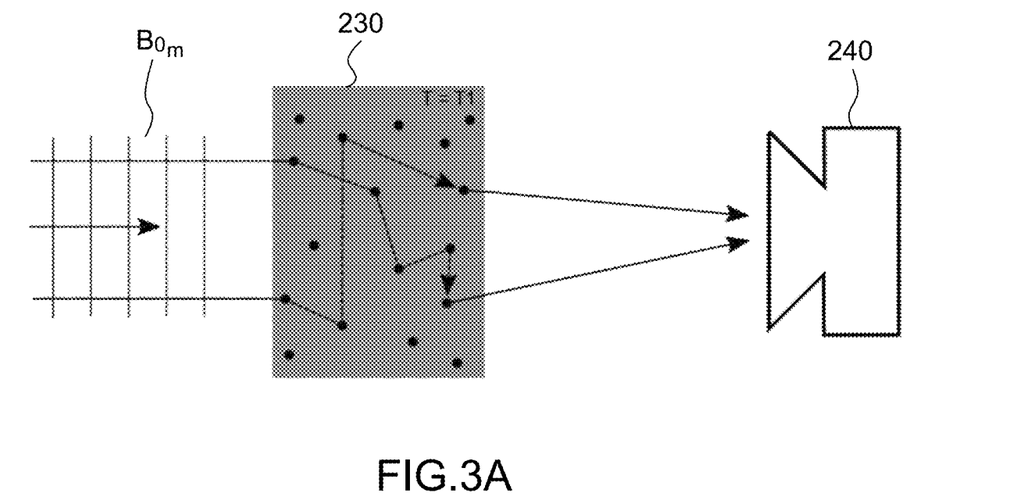
FIGS. 3A and 3B, schemes illustrating the influence of temperature on the multiple scattering medium.
Figure 3B:
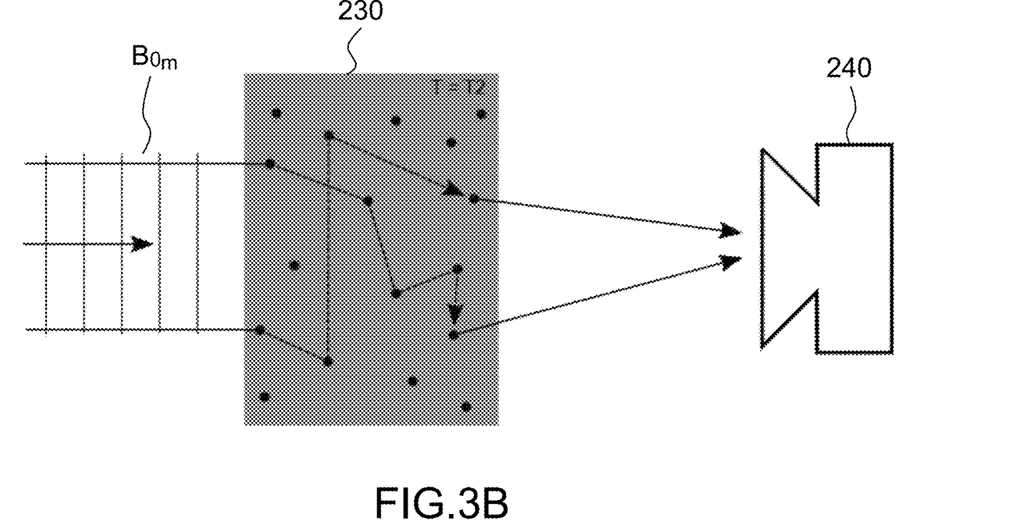

FIGS. 3A and 3B illustrate the influence of temperature on the MSM in an OPU as shown in FIG. 2 and by way of consequence, on the transmission matrix M before the stabilization.

An incoming beam $B_{0m}$ (see FIG. 2) is following random paths inside a multiple scattering medium 230 (MSM) before exiting. The resulting interference pattern is then registered by the optical detector of the detecting unit 240. For illustrative purposes two such random scattering paths have been drawn (dashed lines inside the MSM).

In the upper scenario (FIG. 3A), the MSM is at a temperature $T_1$. The lower scenario (FIG. 3B) is equivalent except that the MSM has changed temperature to $T_2$, and has consequently undergone a thermal expansion. The scaling of the material dimensions is determined by the thermal expansion coefficient $\alpha$ and the temperature difference $\Delta T$. In practice this means that the lengths of all the random scattering paths Li in the interior of the MSM have been scaled by the same factor $\xi$:

$$Li \to Li(1+\alpha\Delta T)=Li\xi$$

The factor $(1+\alpha \Delta T)=\xi$ is close to 1. The interference pattern at the detector, which depends on the relative differences of the lengths of the optical paths, will consequently change.

The applicant has shown that the interference pattern can, to first order, be restored when the wavelength of the source is also scaled.

Another way to motivate this is by using the transmission matrix M. The transmission matrix depends on the laser frequency f, and may depend on one or more environmental parameters like the temperature T of the MSM 230, i.e. M=M(f, T).

At an initial laser frequency $f_0$ and temperature $T_0$, the light field at the detection plane 241 will be given by $y_0=M(f_0, T_0) x$, where x is the information encoded in the laser beam $B_{0m}$ in FIG. 2. Changing the temperature of the MSM 230 to $T_1$ will result in a different light field $y_1=M(f_0, T_1)$ x. Within limits, this change can be compensated by tuning the laser frequency to a frequency $f_1$ such that $M(f_1, T_1) \approx M(f_0, T_0)$.

In practice, the exact scaling factor does not need to be necessarily known, and the tuning of the wavelength may be done using a control loop. However, the applicant has shown that to restore the original interference pattern the wavelength may be scaled by approximately the same factor:

$$\lambda \rightarrow \lambda(1+\alpha\Delta T)=\lambda\xi$$

It should be noted that the thermal expansion or contraction in this example mainly affects the path lengths inside the MSM. Changes of the paths outside the MSM are supposed to be negligible in comparison.

It is clear that this scheme is not restricted to the example given here. In general, the fluctuation of any parameter that induces a global scaling of the lengths of the optical paths that contribute to an interference pattern can be corrected via appropriate wavelength tuning, according to exemplary methods that are described below.

Figure 4:
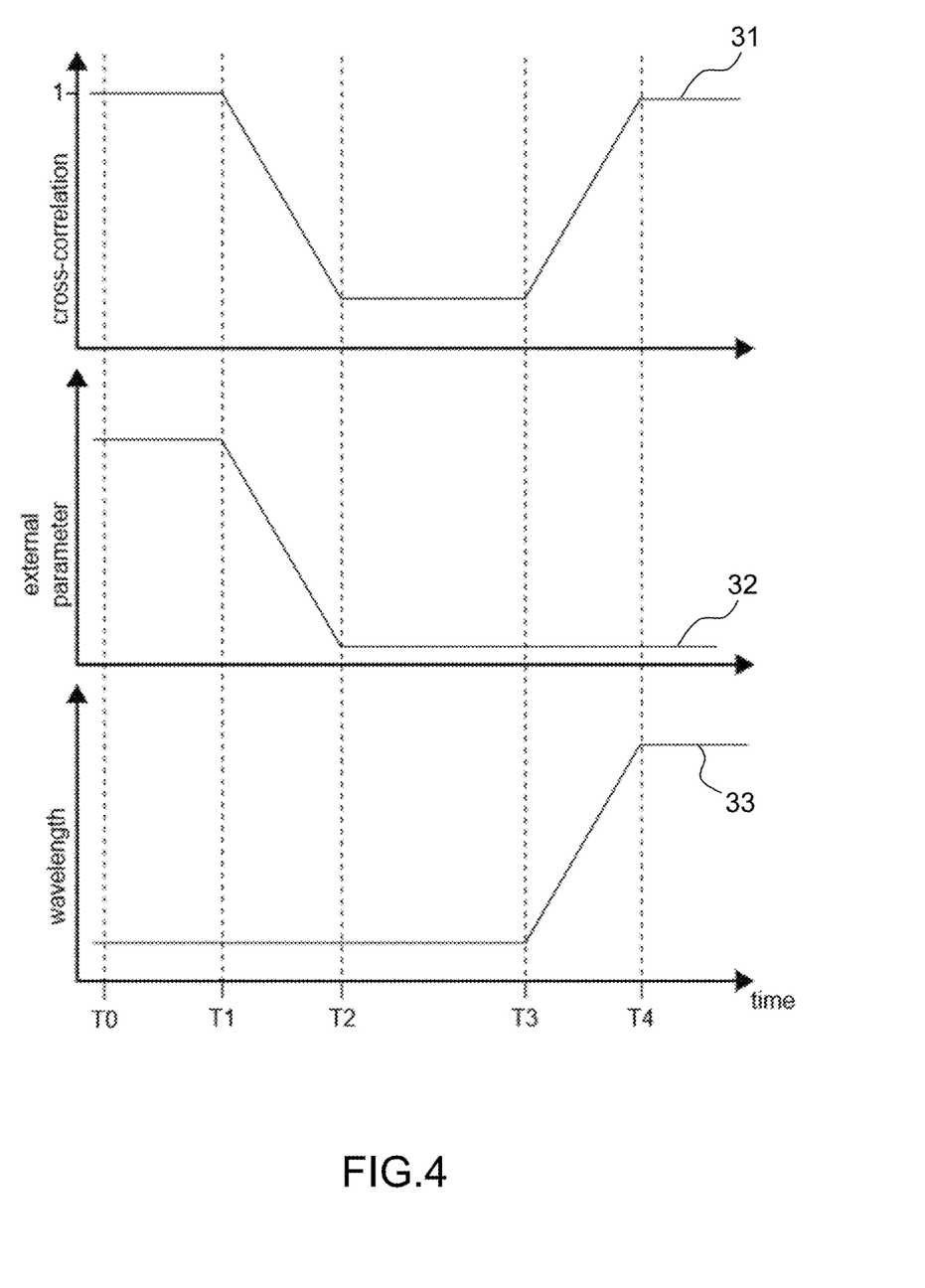
FIG. 4, diagrams illustrating the control of the wavelength of the laser source in a stabilized interferometric system according to an example of the present description.

FIG. 4 shows schematically diagrams illustrating the control of the wavelength of the laser source in a stabilized interferometric system according to an example of the present description.

The (normalized) cross-correlation (curve 31) is a measure of similarity used to compare two interference patterns. One, from now on referred to as the "reference", is taken at the beginning at time T0. The other is taken at a later point in time.

The reference pattern may for example result from the interferences between randomly scattered optical paths taken by a reference beam through the multiple scattering material, wherein the reference beam results from a spatial modulation of a parameter of said initial beam $B_0$ based on reference input data. For example, in order to create the reference beam, the SLM may be programmed not to alter the characteristics of the beam at all, such that $B_{0m}=B_0$ (See FIG. 2).

A cross-correlation close to 1 is a sign that the second interference pattern has hardly changed with respect to the reference pattern. A cross-correlation significantly lower than 1 on the other hand is a sign that the interference pattern has evolved and become less similar to the reference pattern.

FIG. 4 shows that the cross-correlation is constant and close to 1 up until time $T_1$.

Due to a change of an external parameter between times $T_1$ and $T_2$ (curve 32), e.g. the temperature, the interference pattern is evolving and the cross-correlation consequently decreases to a value significantly lower than 1.

Between times $T_2$ and $T_3$ all relevant parameters of the system are constant. The interference pattern is different from the reference but constant, leading to the value of the cross-correlation to be constant at a value smaller than 1.

Between times $T_3$ and $T_4$ the wavelength of the laser is adjusted such that the change of the interference pattern induced by the variation of the external parameter is largely restored. Consequently, the cross-correlation is brought back to a value close to 1.

From time $T_4$, it is assumed that all relevant parameters are constant again. Even though the external parameter now differs from its initial value, a change of the wavelength has compensated its effect on the interference pattern.

The above figure shows the qualitative behavior of the system. The exact dependence between the cross-correlation and the external parameter/the wavelength may vary.

This scheme may be implemented such that the interference pattern is periodically compared to the reference, and adjustments of the wavelength are then performed. In this case the evolution of the cross-correlation, the external parameter, and the wavelength may qualitatively follow the step by step evolution shown in FIG. 4.

Another possible implementation of the scheme is a constant monitoring using a control loop. In this case, a change of the interference pattern would trigger a more immediate reaction to adjust the wavelength accordingly. The remaining delay would only be limited by the bandwidth of the control loop. In other words, and with the notation of FIG. 4 above, the wavelength would be adjusted within the interval between times $T_1$ and $T_2$, provided $1/(T_2-T_1)$ is smaller than the bandwidth of the control loop.

Note that since the same beam path in FIG. 2 including the SLM 220 and the detector 240 is used for optical calculation and for determining how to tune the laser frequency, both cannot happen at the same time. Therefore, the system as described in FIG. 2 runs for a certain amount of time, during which optical calculations are performed, without laser frequency adjustment. Then, either by periodically interrupting a running batch of optical calculations, or in between two scheduled batches of optical calculations, a laser frequency tuning routine can be started to recover an optimal cross-correlation.

A possible way to achieve continuous adjustment is the use of one ore many environmental sensors 260 that monitor parameters that influence the transmission matrix. Through a heuristic a priori calibration, the necessary adjustment of the laser frequency as a function of the evolution of one or many environmental parameters is known. It is then possible to continuously tune the laser frequency without the need to record the interference patterns and compare them to the reference pattern. Since this is an indirect measure, occasional direct measures of the light field at the plane 241 may be taken in order to correct any residual drift. But these measurements may be scheduled at larger intervals, and more flexibly than without the continuous laser frequency tuning with the help of environmental sensors.

Finally, it should be noted that the method according to the present description does not specifically rely on the use of the cross-correlation. Indeed, any adequate measure that quantifies the evolution of the interference pattern may be used. This may be a different algorithm that compares interference patterns, or measures of external parameter(s) that correlate in a reproducible way with a change of the interference pattern.

Figure 5:
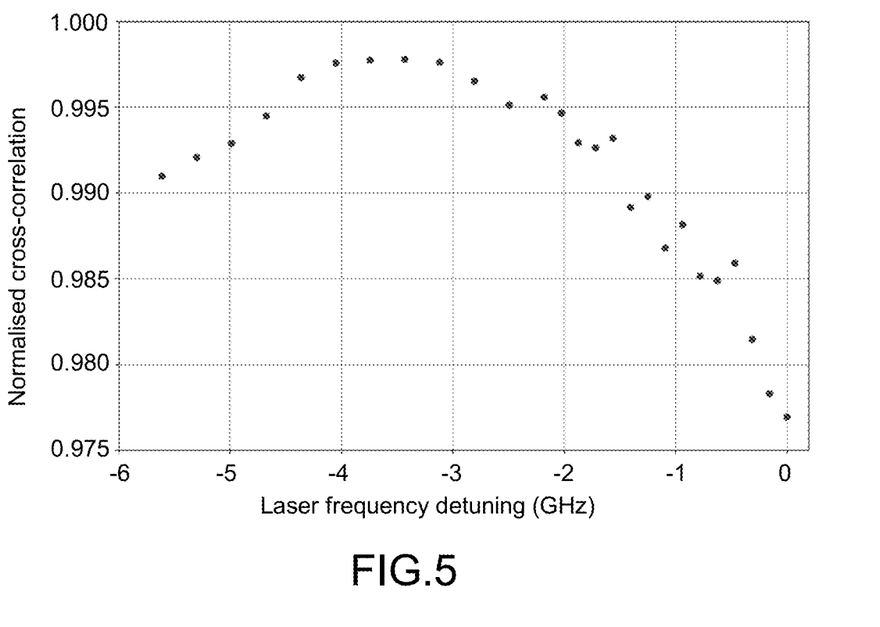
FIG. 5, a curve showing experimental data of normalized cross-correlation values calculated between two interference patterns, a first inference pattern at an initial time and given initial environmental temperature and second interference patterns acquired at a different environmental temperature and for different values of a laser frequency detuning of the laser source.

The applicant has experimentally demonstrated the feasibility of the method as described in the present disclosure. FIG. 5 is a curve showing experimental data of normalized cross-correlation values calculated between two interference patterns, a first inference pattern at an initial time and given initial environmental temperature, and second interference patterns acquired at a different environmental temperature and for different values of a laser frequency detuning of the laser source;

The optical setup is similar to the one shown in FIG. 2. For the purpose of the demonstration, a temperature control of the MSM is installed (not shown in FIG. 2). The laser source is a single frequency RWS laser diode, whose frequency can be tuned via the applied diode current. A reference image is taken while the MSM is at a temperature T1 of 28.5 C, and the laser diode current is 75.0 mA (corresponding to a detuning of 0 GHz in the plot). Then the temperature is changed by 0.3 C to T2=28.8 C while leaving all other parameters constant, a second picture is taken, and a normalized cross-correlation between the second picture and the reference image is calculated. Due to the temperature change the value of the normalized cross-correlation has decreased to below 0.98.

While leaving all other parameters constant, the laser frequency is then tuned via a change of the laser diode current. At a detuning of between −3 and −4 GHz (which corresponds to a change of the diode current by between +2 and +2.5 mA) the temperature induced change of the optical paths has mostly been compensated by the change in the frequency of the laser, as manifested by the nearly fully recovered cross-correlation. A further detuning beyond −4 GHz overcompensates, and the normalized cross-correlation decreases.

FIG. 5 shows the data from a simplified test setup, which nevertheless includes all the fundamental ingredients to test the viability of our method. It shows that the change of an interference pattern, which is produced by the passing of coherent light through a MSM, can at least partially be reversed by tuning the laser frequency. In the presented data, this change was caused by a controlled modification of the temperature of the MSM. But the result can be generalized to all mechanisms which induce a global scaling of the length of the optical paths involved in the creation of the interference pattern. The method applied in this test can be implemented in OPUs without fundamental difficulty.

Figure 6:
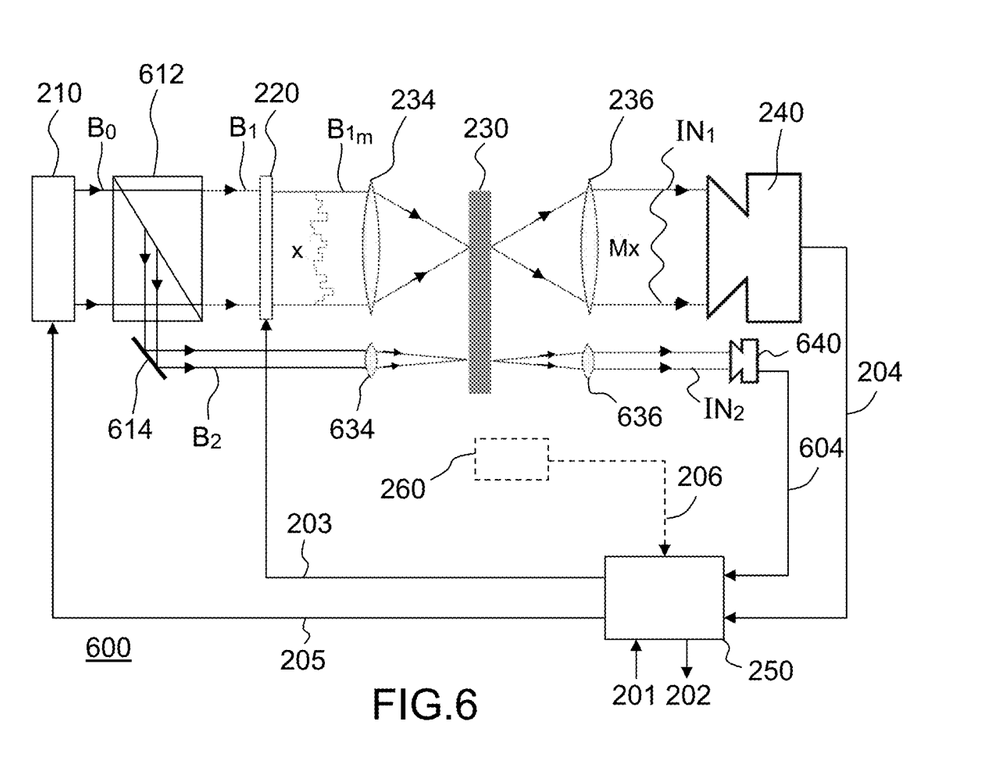
FIG. 6, schematic of an optical processing unit (OPU) with a stabilized interferometric system according to another embodiment of the present description.

FIG. 6 is a schematic of an optical processing unit (OPU) including a stabilized interferometric system 600 according to an embodiment of the present description.

In this embodiment, the detection unit is configured, as in FIG. 2, to acquire an interference pattern $IN_1$ resulting from the interferences between randomly scattered optical paths taken by a spatially modulated beam $B_{1m}$ through the multiple scattering medium 230, wherein said spatially modulated beam $B_{1m}$ is generated by the spatial modulation of a parameter of a first part $B_1$ of said initial beam $B_0$, using the SLM 220.

Further, the detection unit is configured to acquire a reference interference pattern $IN_2$ resulting from the interferences between randomly scattered optical paths taken by a reference beam $B_2$ through the multiple scattering medium 230, wherein said reference beam is generated by a second part $B_2$ of said initial beam $B_0$ directly sent to said multiple scattering material. By "directly sent", it is meant that the second part $B_2$ of said initial beam $B_0$ is not modulated by the SLM 220. As shown in FIG. 6, the stabilized interferometric system 600 may comprise a beam splitter 612 and a reflector element 614 to take the second part $B_2$ of said initial beam $B_0$ and to form a reference beam path comprising a second detector 640 (or reference detector).

As in FIG. 2, lenses, symbolized by 634 and 636, may be placed around the MSM in order to shape the beam to optimize for example the optical flux and the speckle grain size on the detector.

For example, the detection unit comprises a first detector 240 and said second detector 640, as shown in FIG. 6. Alternatively, the interference pattern $IN_1$ and the reference interference pattern $IN_2$ may be acquired on different areas of a detection surface of the same detector.

The control unit is 250 is then configured to receive the output data 604 issued by the detector 640 and to vary the frequency of the laser source as a function of a change in said reference interference pattern.

Designing a reference beam path as shown in FIG. 6 ensures that varying outside parameters affect the reference beam and the OPU beam in a similar way. Tuning the frequency of the laser source such that the reference detector always registers a constant pattern then insures an increased stability of the OPU beam path.

Using a separate beam $B_2$ passing through the MSM, as shown in FIG. 6, enables to achieve laser frequency adjustment via a continuous control loop. The separate beam $B_2$ is emitted by the same laser source 210; therefore, monitoring the evolution of the interference pattern IN2 with the detector 640 makes it possible to continuously tune the laser frequency.

As described in reference to FIG. 2, it is also possible to install one or a plurality of environmental sensors 260 (for example temperature probes) at suitable positions in the OPU. Through prior calibration it is then possible to infer the frequency change of the laser source that will at least partially compensate a change detected in an external (environmental) parameter.

Although described by way of a number of detailed example embodiments, the systems and methods according to the present description comprise various variants, modifications and improvements that will be obvious to those skilled in the art, it being understood that these various variants, modifications and improvements fall within the scope of the invention such as defined by the following claims.

The invention claimed is:

1. A stabilized interferometric system comprising:
    a light source for emitting an initial beam of coherent light;
    a spatial light modulator configured to receive at least a first part of said initial beam and input data, and configured to emit a spatially modulated beam resulting from a spatial modulation of a parameter of said first part of said initial beam based on said input data;
    a scattering medium configured to receive said spatially modulated beam;
    a detection unit configured to acquire an interference pattern in a first detection plane at an output of said scattering material, wherein said interference pattern results from the interferences between randomly scattered optical paths taken by the spatially modulated beam through the scattering material; and
    acquire a reference interference pattern in said first detection plane; the reference interference pattern resulting from the interferences between randomly scattered optical paths taken by a reference beam through the scattering material; and
    a control unit configured to vary the frequency of the light source as a function of a change in said reference interference pattern in order to at least partially compensate a change in said interference pattern resulting from a change in at least one environmental parameter, wherein varying the frequency of the light source comprises:
        calculating a measurement of similarity between two interference patterns corresponding to said reference interference pattern acquired at two different times;
        determining a variation of the frequency to apply to the light source based on said measurement of similarity.

2. The stabilized interferometric system of claim 1, wherein said reference beam results from a spatial modulation of a parameter of said first part of said initial beam based on a reference digital input signal.

3. The stabilized interferometric system of claim 1, further comprising a reference optical detector
    configured to acquire said reference interference pattern resulting from the interferences between randomly scattered optical paths taken by a reference beam through the scattering material, wherein said reference beam is generated by a second part of said initial beam directly sent to said scattering medium.

4. The stabilized interferometric system of claim 1, further comprising:
an environmental sensor configured to monitor at least one environmental parameter; and wherein
the control unit is configured to vary the frequency of the light source as a function of a change in a measure of said at least one environmental parameter.

5. The stabilized interferometric system of claim 1, wherein the scattering medium is a multiple scattering medium.

6. A method for stabilization of an interferometric system, wherein said interferometric system comprises:
a light source for emitting an initial beam of coherent light;
a spatial light modulator configured to receive at least a first part of said initial beam and input data, and configured to emit a spatially modulated beam resulting from a spatial modulation of a parameter of said first part of said initial beam based on said input data;
a scattering medium configured to receive said spatially modulated beam;
a detection unit configured to
acquire an interference pattern in a first detection plane at an output of said scattering medium, wherein said interference pattern results from the interferences between randomly scattered optical paths taken by the spatially modulated beam through the scattering medium;
wherein the method comprises:
acquiring, using said detection unit, a reference interference pattern in said detection plane, wherein said interference pattern results from the interferences between randomly scattered optical paths taken by a reference beam through the scattering medium;
varying the frequency of the light source as a function of a change in said reference interference pattern in order to at least partially compensate a change in said interference pattern resulting from a change in at least one environmental parameter;
wherein varying the frequency of the light source comprises
calculating a measurement of similarity between two interference patterns corresponding to said reference interference pattern acquired at two different times; and
determining a variation of the light source frequency to apply to the light source based on said measurement of similarity.

7. The method for stabilization of claim 6, further comprising spatially modulating a parameter of said first part of said initial beam using a reference digital input signal to generate said reference beam.

8. The method for stabilization of claim 6, wherein:
the reference interference pattern is acquired using a reference optical detector, and wherein said reference beam is generated by a second part of said initial beam directly sent to said scattering medium.

9. The method for stabilization of claim 6, further comprising:
monitoring, using an environmental sensor, at least one environmental parameter; and wherein
varying the frequency of the light source is made as a function of a change in a measure of said at least one environmental parameter.

10. The method for stabilization of claim 6, wherein a parameter of said first part of said initial beam spatially modulated is the amplitude, the intensity, the phase and/or the polarization of the initial beam.

11. The method for stabilization of claim 6, wherein the scattering medium is a multiple scattering medium.

* * * * *